United States Patent
Sato et al.

(10) Patent No.: US 7,486,328 B2
(45) Date of Patent: Feb. 3, 2009

(54) PICTURE-TAKING LENS, IMAGE PICK-UP UNIT AND HAND-HELD DEVICE

(75) Inventors: Masae Sato, Machida (JP); Eigo Sano, Hino (JP)

(73) Assignee: Konica Minolta Opto, Inc., Tokyo (JP)

(*) Notice: Subject to any disclaimer, the term of this patent is extended or adjusted under 35 U.S.C. 154(b) by 637 days.

(21) Appl. No.: 11/258,935

(22) Filed: Oct. 27, 2005

(65) Prior Publication Data

US 2006/0092310 A1 May 4, 2006

(30) Foreign Application Priority Data

Nov. 1, 2004 (JP) ............................. 2004-317932

(51) Int. Cl.
*H04N 5/225* (2006.01)
*G02B 9/34* (2006.01)

(52) U.S. Cl. ...................................... 348/335; 359/773

(58) Field of Classification Search ............ 348/208.11, 348/335; 359/362, 642–697, 708, 715, 773
See application file for complete search history.

(56) References Cited

U.S. PATENT DOCUMENTS

| | | | |
|---|---|---|---|
| 5,940,219 A | 8/1999 | Yamada | |
| 6,476,982 B1 * | 11/2002 | Kawakami | 359/791 |
| 6,560,041 B2 * | 5/2003 | Ikeda et al. | 359/749 |
| 7,061,695 B2 * | 6/2006 | Cahall et al. | 359/785 |
| 7,304,807 B2 * | 12/2007 | Isono | 359/716 |
| 2003/0210475 A1 | 11/2003 | Shinohara | |
| 2005/0013018 A1 * | 1/2005 | Ning | 359/784 |

FOREIGN PATENT DOCUMENTS

JP 2004-163786 6/2004

OTHER PUBLICATIONS

European Search Report.

* cited by examiner

*Primary Examiner*—Lin Ye
*Assistant Examiner*—Trung Diep
(74) *Attorney, Agent, or Firm*—Finnegan, Henderson, Farabow, Garrett & Dunner, L.L.P.

(57) ABSTRACT

A picture-taking lens for forming an image of an object image on a solid picture-taking element, comprising in order from the object side: a first lens having a positive refractive power and directing a convex surface toward the object side; an aperture stop, a second lens having a positive refractive power and a meniscus shape directing a convex surface toward the image side; and a third lens having a negative refractive power and directing a concave surface toward the image side, wherein the picture-taking lens satisfies the following conditional expression: $0.20<R1/f<0.42$, $0.10<D2/f<0.40$, where R1 is a radius of curvature of the object side surface of the first lens, D2 is an air gap on the axis between the first lens and the second lens, f is a focal length of a whole system of the picture-taking lens.

8 Claims, 14 Drawing Sheets

FIG. 3 (b)
FIG. 3 (a)
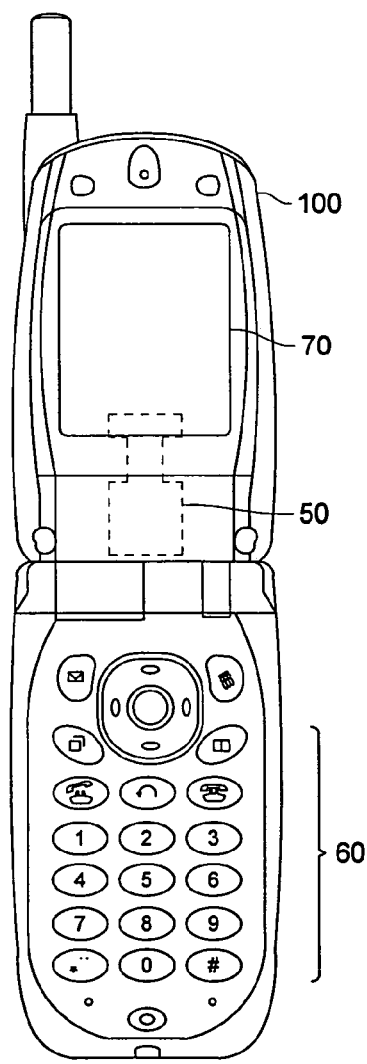
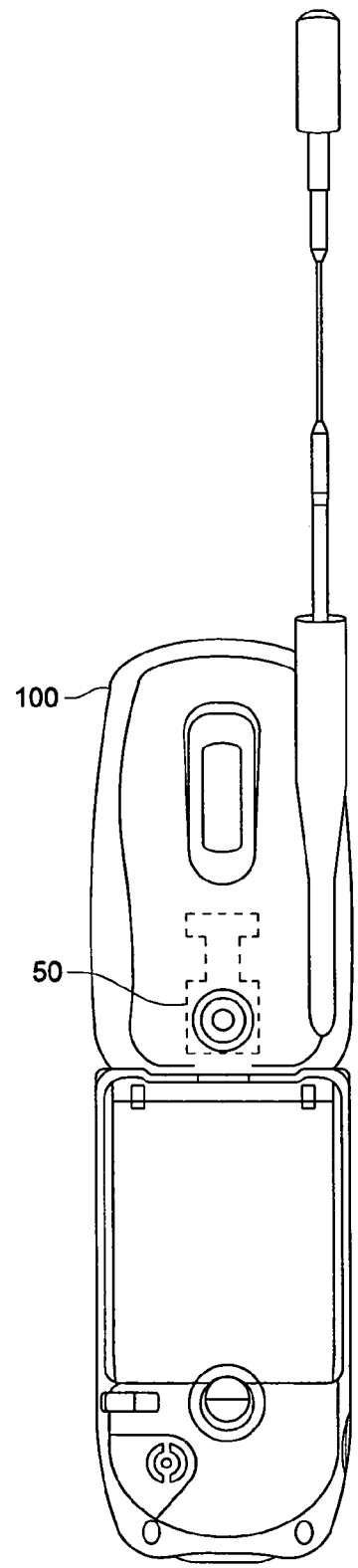

F=4.12

SPHERICAL ABERRATION

— d-LINE
---- g-LINE

Y=2.800

ASTIGMATISM

— S
---- M

Y=2.800

DISTORTION ABERRATION

MERIDIONAL COMA

— d-LINE
---- g-LINE

MERIDIONAL COMA

FIG. 12 ( a )
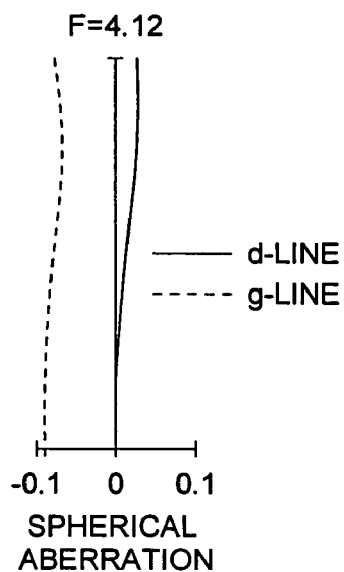
FIG. 12 ( b )
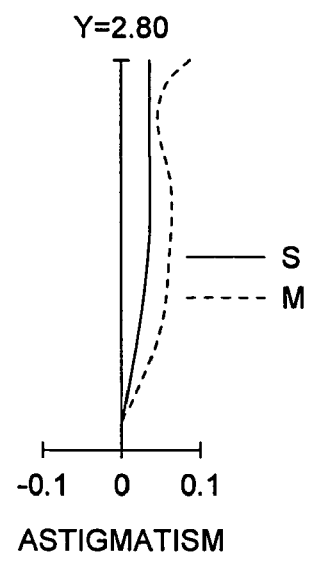
FIG. 12 ( c )
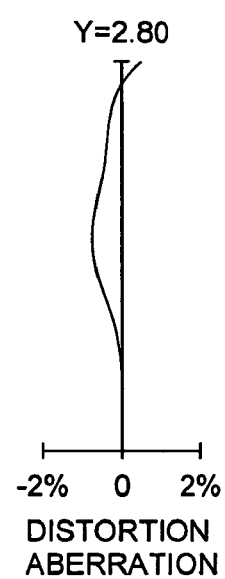
FIG. 12 ( d )
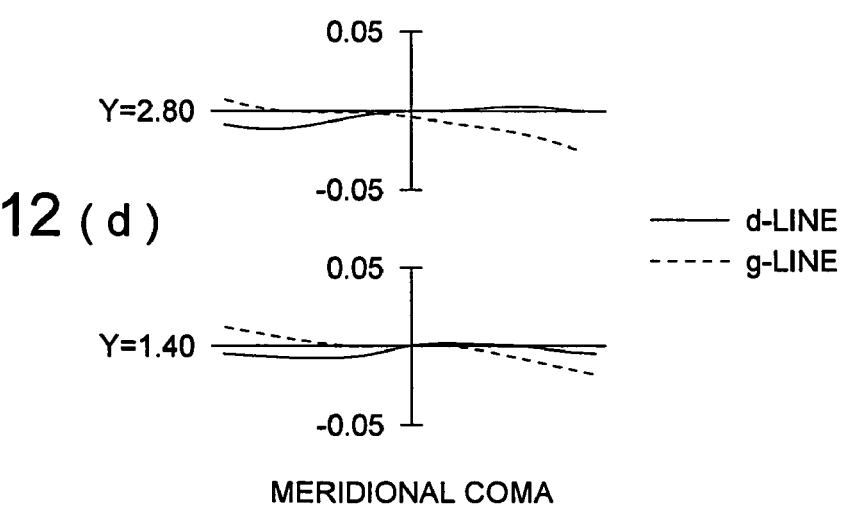

PICTURE-TAKING LENS, IMAGE PICK-UP UNIT AND HAND-HELD DEVICE

This application is based on Japanese Patent Application No. 2004-317932 filed on Nov. 1, 2004, in Japanese Patent Office, the entire content of which is hereby incorporated by reference.

BACKGROUND OF THE INVENTION

The present invention relates to a small sized picture-taking lens using a solid picture-taking element such as a CCD type image sensor or a CMOS type image sensor, an image pick-up unit and a hand-held decive provided herewith.

Recently, following the technical advantage, size reduction of an image pick-up apparatus using a solid picture-taking element such as a CCD (Charge Coupled Device) type image sensor or a CMOS (Complementary Metal Oxide Semiconductor) type image sensor, a mobile phone provided with the image pick-up apparatus or a mobile information terminal is propagating. Further, for the picture-taking lens mounted in these image pick-up apparatus, the requirement for the further size reduction rises.

As an picture-taking lens for such a use, because the technical advantage can be obtained as compared with a lens of single lens or 2-lens composition, a lens of 3-lens composition is well known. A so-called triplet type picture-taking lens composed of, in an order from an object side, the first lens having a positive refractive power, the second lens having a negative refractive power, the third lens having a positive refractive power, is disclosed, for example, in Patent Document 1.

Further, a so-called tele-photo type picture-taking lens composed of, in order from an object side, the first lens having a positive refractive power, the second lens having a positive refractive power, the third lens having a negative refractive power, is disclosed, for example, in Patent Document 2.

[Patent Document 1] Tokkai No. 2001-75006

[Patent Document 2] Tokkai No. 2003-322792

However, the picture-taking lens which is a type disclosed in Patent Document 1 is a type in which, while a wide image angle is secured, aberrations are collected well, however, on the one hand, the total length of the picture-taking lens (a distance on the optical axis from the most object side surface of the picture-taking lens to the image side focal point) is comparatively long, and it can not be said that the lens is not always appropriate for the size reduction. Further, the picture-taking lens which is a type written in Patent Document 2, is a structure which is advantageous for reducing the total length of the picture-taking lens, however, there is a scope of betterment for the further size reduction.

SUMMARY OF THE INVENTION

In view of such problems, the object of the present invention is to provide an picture-taking lens of 3-lens composition in which although it is a smaller sized lens than the conventional type one, aberrations are corrected well, an image pick-up unit and hand-held device provided therewith.

Herein, for a scale of small sized picture-taking lens, the present invention aims the size reduction in the level satisfying the following expression. When this range is satisfied, the total length of the picture-taking lens can be reduced, and the outer diameter of the lens can also be synergistically reduced. Hereby, the size and weight reduction of the whole of image pick-up apparatus becomes possible.

$$L/f<1.40 \quad (7)$$

Where, L: a distance on the optical axis from the most object side lens surface of the whole system of the picture-taking lens to the image side focal point, f: a focal length of the whole system of the picture-taking lens.

Herein, the image side focal point means an image point when the parallel ray of light which is parallel to the optical axis is incident on the picture-taking lens. Hereupon, when the parallel plate such as an optical low-pass filter, infrared cut-filter or a seal glass of the solid picture-taking element package is arranged, the parallel plate part is made an air conversion distance, and calculates the above-described L. Further, more preferably, the range of the following expression is better.

$$L/f<1.30 \quad (7')$$

The picture-taking lens written in item 1 is an picture-taking lens by which an object image is image-formed on a solid picture-taking element, and which is characterized in that it is composed of, in order from the object side, the first lens having a positive refractive power and directing the convex surface to the object side, an aperture stop, the second lens having a positive refractive power and meniscus shape directing the convex surface to the image side, and the third lens having a negative refractive power and directing the concave surface to the image side, and satisfies the following conditional expression.

$$0.20<R1/f<0.42 \quad (1)$$

$$0.10<D2/f<0.40 \quad (2).$$

Where, R1: radius of curvature of the object side surface of the first lens, D2: air gap on the axis between the first lens and the second lens, f: focal length of the whole system of the picture-taking lens.

A basic structure of the present invention to obtain the picture-taking lens which is small sized and whose aberration is finely corrected, is composed of, in order from the object side, the first lens having a positive refractive power and directing the convex surface to the object side, an aperture stop, the second lens having a positive refractive power and meniscus shape directing the convex surface to the image side, and the third lens having a negative refractive power and directing the concave surface to the image side. This lens composition of so-called tele-photo type in which in order from the object side, a positive lens group composed of the first lens and the second lens, and the negative third lens directing the concave surface to the image side, are arranged, is an advantageous composition for reducing the total length of the picture-taking lens and the size.

For the aberration correction, because the positive refractive power is shared by the first lens and the second lens, the generation of the spherical aberration or the coma can be suppressed. Further, because the aperture stop is arranged between the first lens and the second lens, and because the first lens has the shape directing the convex surface to the object side, and the second lens has the meniscus shape directing the convex surface to the image side, this lens is a structure in which the magnification chromatic aberration or distortion aberration is easily corrected.

The conditional expression (1) is an expression by which the radius of curvature on the object side of the first lens is adequately set. When R1/f is lower than the upper limit, the reduction of the total length of the picture-taking lens becomes possible. Further, the curvature of field can be finely corrected. On the one hand, when R1/f is larger than the lower limit, the high order spherical aberration or the coma can be suppressed small. Further, the radius of curvature is not too small and the working property of the lens becomes good. Further, more preferably, the range of the following expression is better.

$$0.23 < R1/f < 0.38 \quad (1')$$

The conditional expression (2) is a condition by which the gap between the first lens and the second lens is adequately set and the coma or the curvature of field is finely corrected. When D2/f is lower than the upper limit, the coma or the curvature of field can be finely corrected. Further, because the distance of the aperture stop and the first lens and the second lens becomes close, the lens outer diameter of the first and the second lens does not become large, and becomes advantageous for the size reduction of the picture-taking lens. On the one hand, when D2/f is larger than the lower limit, the space for inserting the aperture stop can be secured enough. Further, more preferably, the range of the following expression is better.

$$0.15 < D2/f < 0.3 \quad (2')$$

The picture-taking lens written in item 2 is characterized in that, in the invention written in item 1, it satisfies the following conditional expression.

$$-5 < P_{air}/P_0 < -1.3 \quad (3)$$

Where, $P_0$: a refractive power of the whole system of the picture-taking lens, $P_{air}$: a refractive power of so-called air lens formed of the image side surface (R2) of the first lens and the object side surface (R3) of the second lens. Further, the refractive power is an inverse number of the focal length, and the Pair can be found by the following expression (4).

$$P_{air} = (1-N1)/R2 + (N2-1)/R3 - \{(1-N1)\cdot(N2-1)/(R2\cdot R3)\}\cdot D2 \quad (4)$$

Where, N1: the refractive index to d-line of the first lens, N2: the refractive index to d-line of the second lens, R2: the radius of curvature of the image side surface of the first lens, R3: the radius of curvature of the object side surface of the second lens, D2: an air gap on the axes between the first lens and the second lens.

The conditional expression (3) is the expression by which, when the refractive power of the air lens formed of the first lens and the second lens is made adequate, the image surface correction and the working property of the lens are made good. When $P_{air}/P_0$ is lower than the upper limit, because the negative refractive power by the air lens can be maintained, Petzval' sum does not becomes too large, and the image surface can be made flat. On the one hand, when $P_{air}/P_0$ is larger than the lower limit, because the negative refractive power by the air lens does not become too strong, the radius of curvature of the second surface and the third surface sandwiching the stop can be made large, and the working property of the lens becomes good. Further, because the second surface and the third surface are separated off-axis, even when the on-axis gap is not made large, the air gap for inserting the stop can be secured enough, and this becomes advantageous for size reduction of the picture-taking lens. Further, more preferably, the range of the following expression is better.

$$-4 < P_{air}/P_0 < -2 \quad (3')$$

The picture-taking lens written in item 3 is characterized in that, in the invention written in item 1 or 2, it satisfies the following conditional expression.

$$-2.0 < f3/f < -0.4 \quad (5)$$

Where, f3: the focal length of the third lens, f: the focal length of the whole system of the picture-taking lens.

The conditional expression (5) is an expression by which the refractive power of the third lens is adequately set. When f3/f is larger than the lower limit, the negative refractive power of the third lens can be adequately maintained, and this lens is effective for the reduction of the total length of the lens and the good correction of off-axis aberrations such as the curvature of field or distortion aberration. On the one hand, when f3/f is lower than the upper limit, the negative refractive power of the third lens is not too larger than it needs, and as the result, because the exit pupil position can be far separated from the solid picture-taking element to the object side, the principal ray incident angle (an angle formed between the principal ray and the optical axis and when the ray is parallel with the optical axis, 0°) of the light flux which image-forms on the peripheral part of the imaging surface of the solid picture-taking element can be suppressed small. As the result, the phenomena (shading) in which the practical aperture efficiency is decreased in the peripheral part of the imaging surface can be suppressed. Further, more preferably, the range of the following expression is better.

$$-1.5 < f3/f < -0.5 \quad (5')$$

The picture-taking lens written in item 4 is characterized in that, in the invention written in item 3, the third lens has double concave shape, and because the negative refractive power is dispersed into the object side surface and image side surface, the radius of curvature of the image side surface does not become too small, and the negative refractive power of the third lens can be made strong. When the negative refractive power of the third lens is set under the conditional expression (5), the gap between the most convex part of the image side surface of the third lens and the imaging surface can be left a space between them, and an picture-taking lens which is superior in the assembling property or adjustment facility, can be provided.

The picture-taking lens written in item 5 is characterized in that, in the invention written in any one of items 1-4, it satisfies the following conditional expression.

$$20 < \{(v1+v2)/2\} - v3 < 65 \quad (6)$$

Where, v1: Abbe's number of the first lens, v2: Abbe's number of the second lens, and v3: Abbe's number of the third lens.

The conditional expression (6) is a condition under which the chromatic aberration of the picture-taking lens whole system is corrected well. When the value of expression (6) is larger than the ilower limit, the chromatic aberration on axis and the magnification chromatic aberration can be corrected with good balance. On the one hand, when the value of the expression (6) is lower than the upper limit, the lens can be structured by the easily obtainable optical material. Further, more preferably, the range of the following expression is better.

$$25 < \{(v1+v2)/2\} - v3 < 65 \quad (6')$$

The picture-taking lens written in item 6 is characterized in that: in the invention written in any one of items 1-5, the first lens, the second lens and the third lens are formed of plastic material.

Recently, the size reduction of the whole of the solid image pick-up apparatus is aimed, and even when it is the solid picture-taking element having the same number of pixels, the pixel pitch is small, and as the result, the smaller one of the imaging surface size is developed. Because, in the picture-taking lens for the solid picture-taking element of such a small imaging surface size, it is necessary that the focal length of the whole system is made comparatively small, the radius of curvature or outer diameter of each lens is considerably reduced. Accordingly, in the case where it is compared with the glass lens manufactured by the troublesome polish processing, when the first lens, the second lens and the third lens are composed of plastic lenses manufactured by the injection molding, even when the it is the lens whose radius of curvature or outer diameter is small, the mass production becomes possible with a low cost. Further, because, in the plastic lens, making aspheric surface is easy, the lens is also advantageous for the aberration correction. Further, when compared with a case where glass mold lens which can be comparatively easily manufactured is adopted even when the lens is small diameter one, because, in the plastic lens, the press temperature can be made low, the wear of the molding die can be suppressed, as the result, the number of replacement or the number of maintenance of the molding die can be reduced and the cost reduction can be intended.

Hereupon, "it is formed of plastic material" includes that the plastic material is made as material, and the case where the coating processing is conducted on its surface for the purpose of the reflection prevention or an increase of the surface hardness. Further, for the purpose that the temperature change of the refractive index of the plastic material is suppressed small, the case where inorganic particles are mixed in the plastic material is also included.

The image pick-up unit written in item 7 is an image pick-up unit in which a solid picture-taking element provided with a photoelectric conversion section, the picture-taking lens, written in any one of items 1-6, which image-forms the objective image on the photoelectric conversion section of the solid picture-taking element, a substrate which holds the solid picture-taking element and has terminals for the external connection for sending and receiving of the electric signal, and a casing which has an opening section for the incidence of ray from the object side and is formed of light shielding member are integrally formed, and is characterized in that: the height in the optical axis direction of the picture-taking lens of the image pick-up unit is not larger than 10 [mm].

When the picture-taking lens of the present invention is used, the smaller sized and higher performance image pick-up unit can be obtained.

Herein, "an opening section for incidence of the ray" indicates, not necessarily limiting to the section which forms the space such as a hole, but the section in which an area which can transmit the incident ray from the object side is formed. Further, "the height in the optical axis direction of the picture-taking lens of the image pick-up unit is not larger than 10 [mm]" means the total length along the optical axis direction of the image pick-up unit provided with the all structures. Accordingly, for example, when the casing is provided on the front surface of the substrate and the electronic parts are installed on the rear surface of the substrate, it is assumed that the distance (in FIG. 2, Δ) from the leading edge part which is the object side of the casing, to the leading edge part of electronic parts protruding on the rear surface is not larger than 10 [mm].

The hand-held device written in item 8 is characterized in that it is provided with the image pick-up unit written in item 7.

When the image pick-up unit of the present invention is used, the hand-held device with the smaller size and higher performance can be obtained.

According to the present invention, although it is smaller sized than the conventional type one, the picture-taking lens of 3-lens composition whose aberrations are finely corrected, the image pick-up unit provided therewith, and the hand-held device can be provided.

BRIEF DESCRIPTION OF THE DRAWINGS

FIG. 3 is a front view (a) of a mobile phone in which the image pick-up unit is applied, and a rear surface view (b) of the mobile phone in which the image pick-up unit is applied.

FIG. 12 is an aberration view of Example 4 (spherical aberration (a), astigmatism (b), distortion aberration (c), meridional coma (d)).

DETAILED DESCRIPTION OF THE PREFERRED EMBODIMENT

Figure 1:
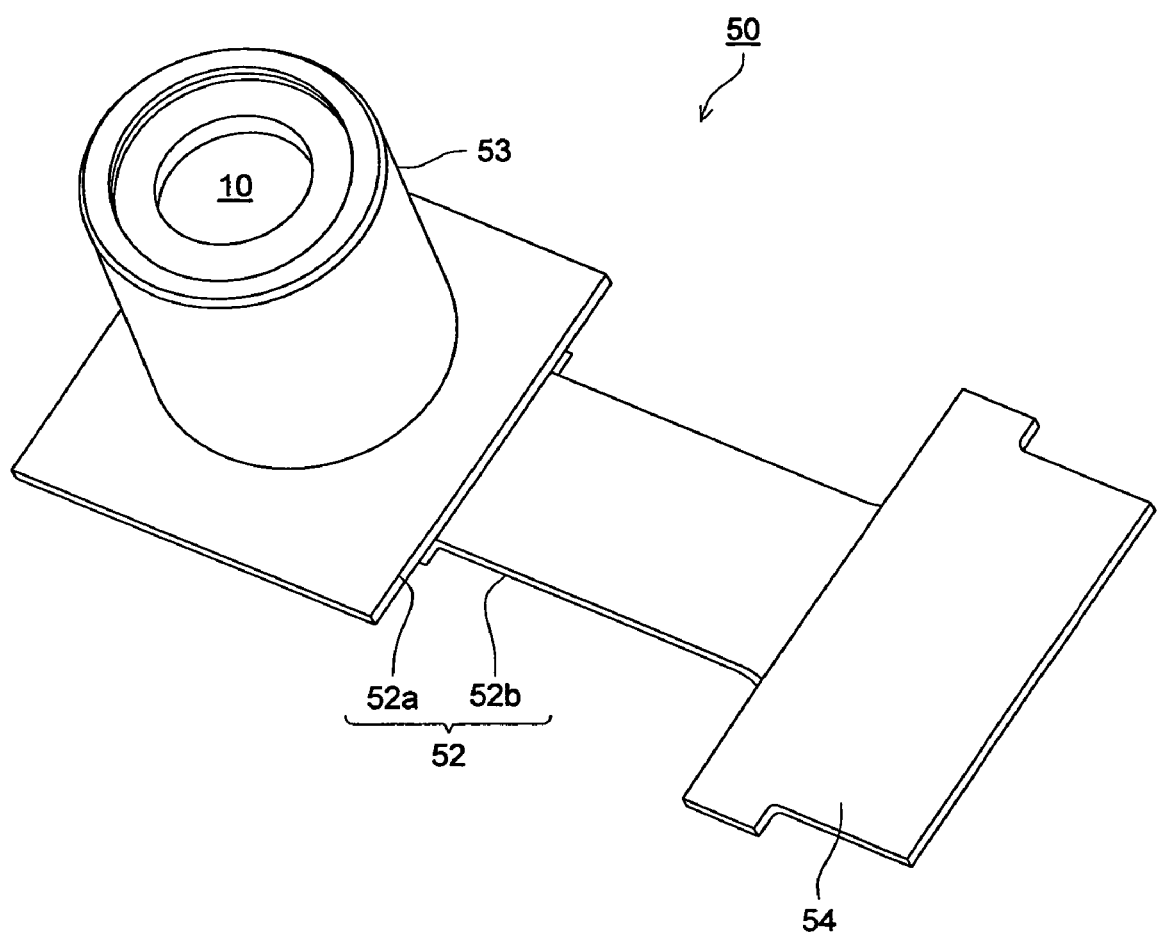
FIG. 1 is a perspective view of an image pick-up unit 50 according to the present embodiment.

Referring to the drawings, an embodiment of the present invention will be described below. FIG. 1 is a perspective view of an image pick-up unit 50 according to the present embodiment, and FIG. 2 is a view typically showing a cross-section along the optical axis of an image pick-up optical system of the image pick-up unit 50.

As shown in FIG. 1, the image pick-up unit 50 is provided with a CMOS type picture-taking element 51 as the picture-taking element having a photo-electric conversion section 51a, the picture-taking lens 10 for image-forming the objective image on the photo-electric conversion section 51a of this picture-taking element 51, a substrate 52 which holds the picture-taking element 51, and has a terminal for the external connection (called also an external connection terminal) 54 (refer to FIG. 1) which conducts sending and receiving of its electrical signal, and a casing 53 which has an opening section for the ray incidence from object side, and as a lens barrel formed of the light shielding member, and they are integrally formed.

Figure 2:
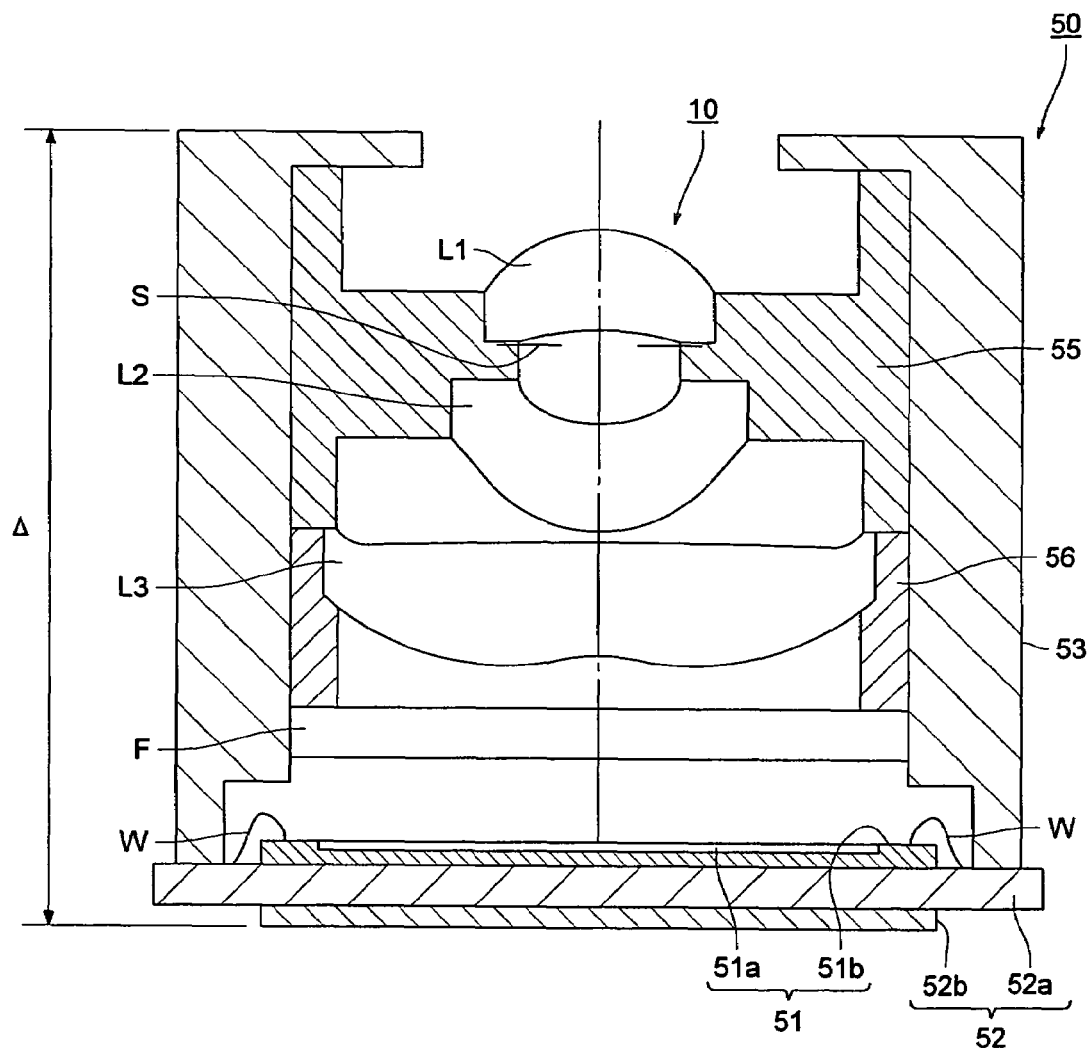
FIG. 2 is a view typically showing a cross-section along the optical axis of an image pick-up optical system of the image pick-up unit 50.

As shown in FIG. 2, in the picture-taking element 51, the photo-electric conversion section 51a as the light receiving section in which pixels (photo-electric conversion elements)

are 2-dimensionally arranged in the central part of the plane on its light receiving side, is formed, and a signal processing circuit 51b is formed in its periphery. Such a signal processing circuit is structured by a drive circuit section by which each pixel is successively driven and signal charges are obtained, an A/D conversion section by which each signal charge is converted into a digital signal, and a signal processing section by which the image signal output is formed by using this digital signal. Further, in the vicinity of outer edge of the plane on the light receiving side of the picture-taking element 51, many number of pads (illustration is neglected) are arranged, and connected to the substrate 52 through wires W. The picture-taking element 51 converts the signal charge from the photo-electric conversion section 51a into an image signal such as digital YUV signal, and outputs to a predetermined circuit on the substrate 52 through wires W. Herein, Y is a brightness signal, U (=R−Y) is a color difference signal of red and the brightness signal, V (=B−Y) is a color difference signal of blue and the brightness signal. Hereupon, the picture-taking element is not limited to the CMOS type image sensor, but other element such as CCD may also be used.

The substrate 52 is provided with a supporting plate 52a for supporting the picture-taking element 51 and the casing 53 on its upper surface, and a flexible substrate 52b whose one end part is connected to the lower surface (the reverse side surface to the picture-taking element 51) of the supporting plate 52a.

The supporting plate 52a has a number of pads for signal transmission, provided on the front and rear surfaces, and on its upper surface side, it is connected to wires W of the picture-taking element 51, and on its lower surface side, connected to the flexible substrate 52b.

In FIG. 1, the flexible substrate 52b is connected in such a manner that its one end part is connected to the supporting plate 52a as described above, and connects the supporting plate 52a to the external circuits (for example, a control circuit which its epistatic apparatus in which the image pick-up unit is mounted has) through the external connection terminal 54 provided on its other end part, and receives the supply of the voltage for driving the picture-taking element 51, or the clock signal from the external circuit, and can output the digital YUV signal to the external circuit. Further, an intermediate part in the length direction of the flexible substrate 52b has the flexibility or deformation property, and by its deformation, the substrate gives the degree of freedom to the direction or arrangement of the external connection terminal 54 against the supporting plate 52a.

In FIG. 2, the casing 53 is fixed and arranged on the surface on which the picture-taking element 51 on the supporting plate 52a of the substrate 52 is provided in the manner that it covers the picture-taking element 51. That is, the casing 53 is formed into cylinder-shape with a flange in which a part on the picture-taking element 51 side is widely opened so that it surrounds the picture-taking element 51 and the other end part has a small opening, and the end part on the picture-taking element 51 side is contacted with and fixed on the supporting plate 52a. Hereupon, the end part on the picture-taking element 51 side of the casing 53 may also contacted with and fixed on the periphery of the photo-electric conversion section 51a on the picture-taking element 51.

The casing 53 is used in such a manner that the other end part in which the small opening (opening part for the ray incidence) is provided faces the object side, and in the inside of the casing 53, an IR (infrared ray) cut filter F is fixed and arranged between the picture-taking lens 10 and the picture-taking element 51.

The picture-taking lens 10 is composed of, in order from the object side, the first lens L1 which has a positive refractive power and faces the convex surface to the object side, the aperture stop S, the second lens L2 of the meniscus shape which has a positive refractive power and faces the convex surface to the image side, and the third lens L3 which has a negative refractive power and faces the concave surface to the image side, and the picture-taking lens 10 has a function to image-form the object image onto the picture-taking element. Hereupon, in FIG. 1, the upper side is made an object side, and the lower side is made an image side, and one dotted chain line in FIG. 2 is made an optical axis common to each of lenses L1, L2, L3.

Hereupon, an illustration is neglected, but an outside light shielding mask e for reducing the incidence of unnecessary light from the outside as possible may also be provided on further object side from the first lens L1. Further, the aperture stop S is a member for determining F-number of the whole system of the picture-taking lens.

Lenses L1, L2 are held by a lens frame 55, and the lens L3 is held by a lens frame 56. When the serially arranged lens frames 55, 56 are brought into contact with the flange of the casing 53 under the conditional that the optical axes of these lenses coincide with the center line of the casing 53, in the inside of the casing 53, each of lenses L1, L2, L3 can be positioned at a predetermined optical axis position. Hereupon, the lens and the lens frame may also be integrally molded.

Although illustration is neglected, in these lenses L1, L2, L3, for example, the range from the center of them up to a predetermined range may be set to a range of the effective diameter having a function as the picture-taking lens, and the outside part from that range may also be set to the flange section which does not function as the picture-taking lens. In this case, in each of lenses L1, L2, L3, when the outer peripheral part of its flange section is engaged with a predetermined position of the casing 53, it can be held inside the casing 53. The IR cut filter F is a member which is formed into, for example, almost rectangular or circular one.

Recently, the size reduction of thes whole image pick-up unit 50 is made an object, and even when it is the solid picture-taking element of the same pixel number, the pixel pitch is small, as the result, an unit whose image surface size of the light receiving section (photo-electric conversion section) is small, is developed. In the picture-taking lens for such a solid picture-taking element whose image surface size is small, in order to secure the same angle of view, because it is necessary that the focal length of the whole system is reduced, the radius of curvature or outer diameter of each lens becomes considerably small. Accordingly, in the glass lens manufactured by the polishing processing, the processing becomes difficult. Accordingly, it is preferable that each of lenses L1, L2, L3 is made of plastic material, and formed by the injection molding. Hereupon, as the image pick-up unit 50, when it is wanted that the image point position variation of the whole system of the picture-taking lens at the temperature change is suppressed small, the first lens L1 may also be a glass-molding lens.

Furthermore, although the illustration is neglected, the light shielding mask may also be arranged between the second lens L2 and the third lens L3, in this case, it is prevented that the unnecessary light is incident on the outside of the effective diameter of the picture-taking lens of the third lens L3 close to the solid picture-taking element, and the generation of a ghost or flare can be suppressed.

The operation of the above-described image pick-up unit 50 will be described below. FIG. 3 shows the situation that the image pick-up unit 50 is installed in a mobile phone 100 as the hand-held device or image pick-up apparatus. Further, FIG. 4 is a control block diagram of the mobile phone 100.

The image pick-up unit 50 is provided in such a manner that, for example, the end surface on the object side of the casing 53 is provided in the rear surface (refer to FIG. 3(b)) of the mobile phone 100, and arranged at the position corresponding to the lower part of the liquid crystal display section.

The external connection terminal 54 (an arrow mark in FIG. 4) of the image pick-up unit 50 is connected to the control section 101 of the mobile phone 100, and outputs the image signal such as the brightness signal or the color difference signal to the control section 101 side.

Figure 4:
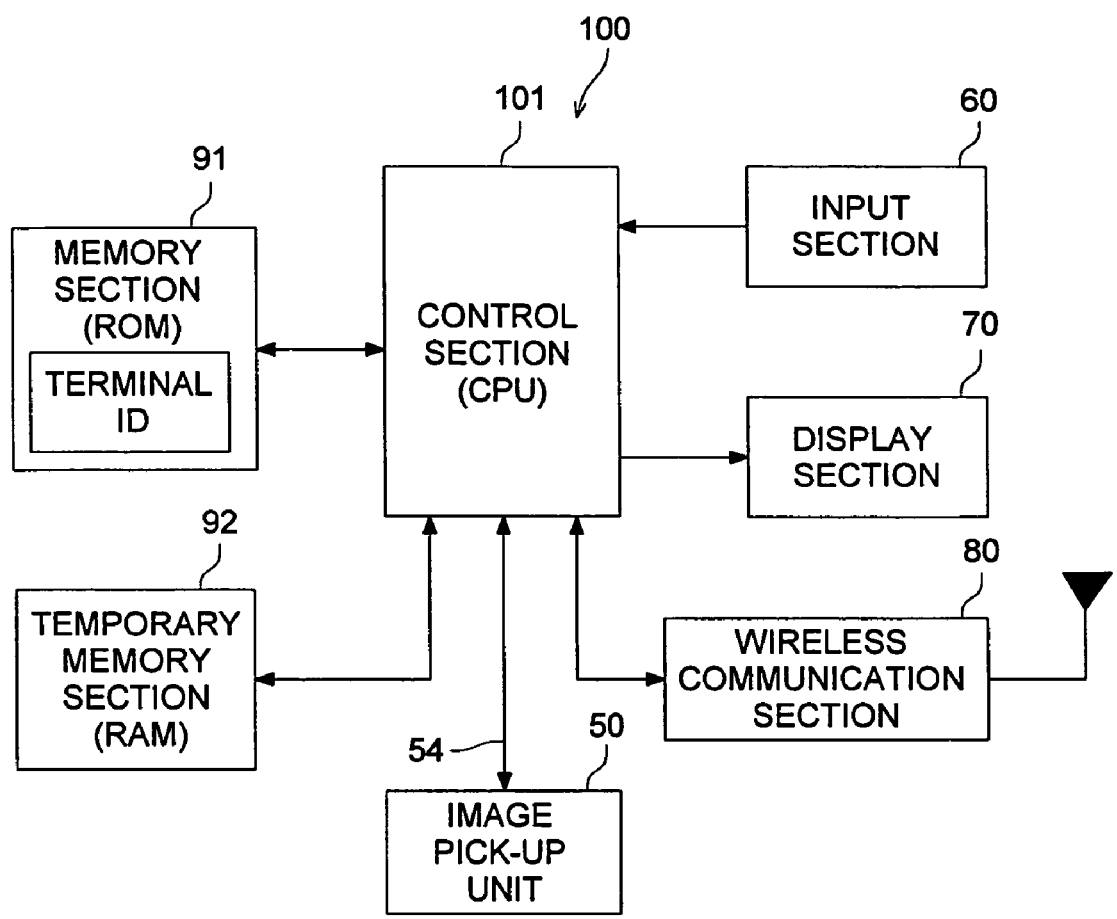
FIG. 4 is a control block diagram of the mobile phone of FIG. 3.

On the one hand, the mobile phone 100 is provided with the control section (CPU) 101 which generally controls, as shown in FIG. 4, each section, and conducts programs corresponding to each processing, an input section 60 for supporting and inputting a number by keys, the liquid crystal display section 70 for displaying the image picked-up image other than the predetermined data, a wireless communication section 80 for realizing each kind of information communication to the external server, a memory section (ROM) 91 which stores the system program of the mobile phone 100, each kind of processing program and the necessary various data of a terminal ID, and a temporary memory section (RAM) 92 used as a working area which temporarily stores each kind of processing program which is conducted by the control section 101, or data or processing data, or the image pick-up data by the image pick-up unit 50.

The image signal inputted from the image pick-up unit 50 is stored in the memory section 92 or displayed on the display section 70, further, transmitted as the image information to the outside through the wireless communication section 80, by the control system of the mobile phone 100.

EXAMPLES

Examples preferable to the above-described embodiment will be shown below. The signs used for each Example are as follows. f: a focal length of the whole system of the picture-taking lens, fB: a back focus, F: F-number, 2Y: a diagonal line length of the image pick-up surface of the solid picture-taking element, R: a radius of curvature, D: a gap between axial surfaces, Nd: a refractive index to d-line of the lens material, vd: Abbe's number of the lens material.

The shape of the aspheric surface in each Example is expressed by the following "Math-1" under the condition that a top of the surface is made the origin, and X axis is defined in the optical axis direction, and the height in the direction perpendicular to the optical axis is h.

$$X = \frac{h^2/R}{1+\sqrt{1-(1+K)h^2/R^2}} + \sum A_i h^i \quad \text{[Math-1]}$$

Where, Ai: i-order aspheric surface coefficient
R: radius of curvature
K: conical constant

Example 1

Lens data of the picture-taking lens according to Example 1 will be shown in Tables 1, and 2.

TABLE 1

Example 1
f = 4.59 mm  fB = 0.73 mm  F = 4.12  2Y = 5.60 mm

| Surface No. | R (mm) | D (mm) | Nd | vd |
|---|---|---|---|---|
| 1 | 1.270 | 0.89 | 1.53180 | 56.0 |
| 2 | 2.656 | 0.17 | | |
| stop | ∞ | 0.70 | | |
| 3 | −1.111 | 0.95 | 1.53180 | 56.0 |
| 4 | −0.970 | 0.10 | | |
| 5 | −6.226 | 1.04 | 1.58300 | 30.0 |
| 6 | 5.324 | 0.40 | | |
| 7 | ∞ | 0.50 | 1.51633 | 64.1 |
| 8 | ∞ | | | |

TABLE 2

Aspheric surface coefficients

The first surface k = 2.48400E−01
A4 = −4.20070E−03
A6 = −2.26110E−02
A8 = 5.29810E−02
A10 = −6.11510E−02
A12 = 2.76070E−02

The 2nd surface

K = 8.53030E+00
A4 = −2.76430E−02
A6 = 7.84860E−02
A8 = −5.11010E−02
A10 = −1.03510E−01

The 3rd surface

K = 8.79050E−01
A4 = −5.58400E−02
A6 = 3.43120E−01
A8 = −6.70050E−01
A10 = 3.30320E−01

The 4th surface

K = −2.65740E+00
A4 = −1.16630E−01
A6 = 1.29380E−01
A8 = −9.62410E−02
A10 = 2.60120E−02
A12 = −2.67790E−03

The 5th surface

K = −5.00000E+01
A4 = 5.15730E−02
A6 = −2.06720E−02
A8 = 4.47830E−03
A10 = −4.92050E−04
A12 = 1.41260E−05
A14 = 4.07080E−08

The 6th surface

K = −5.00000E+01
A4 = −6.61180E−02
A6 = 2.21080E−02
A8 = −4.58350E−03
A10 = 4.95150E−04
A12 = −1.58550E−05
A14 = −1.30480E−06

Hereupon, in the data after this (including the lens data in Tables), it is defined to express the data by using the exponent of 10, (for example, $2.5 \times 10^{-02}$ is expressed by using E (for example, 2.5 E–02)).

Figure 5:
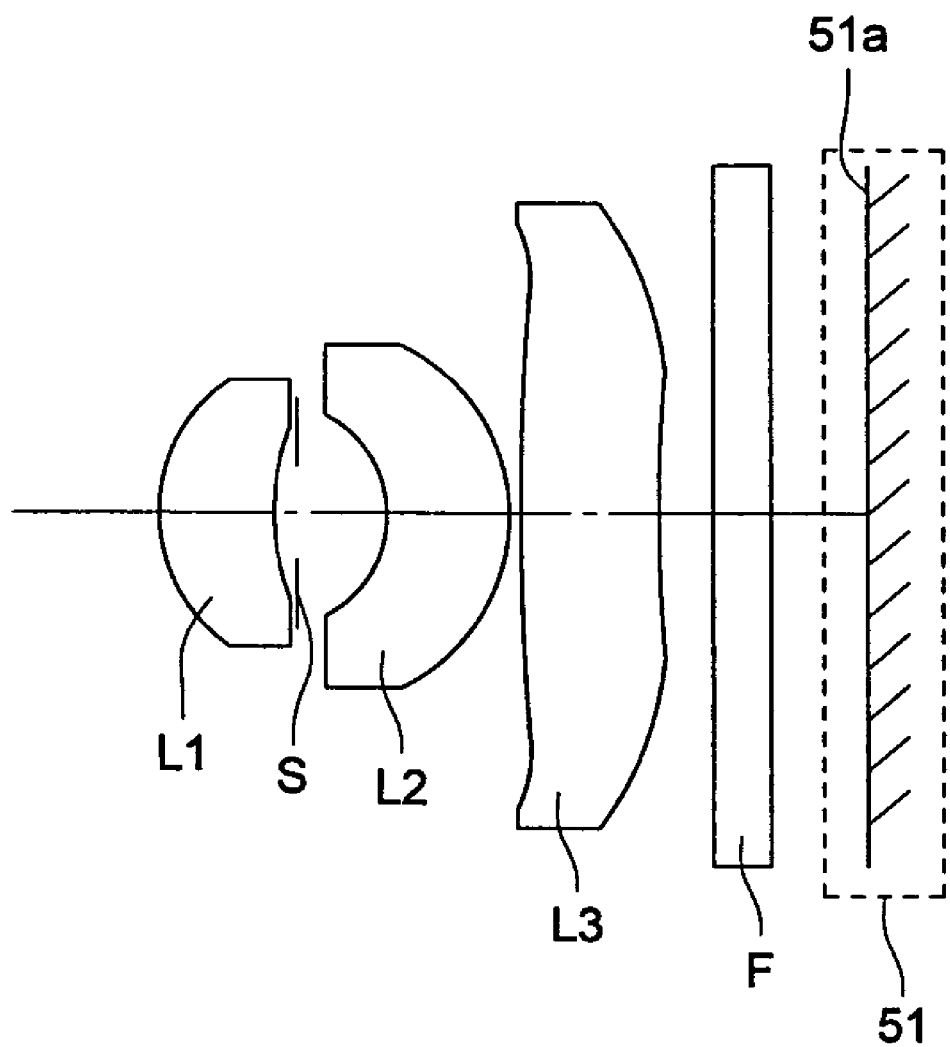
FIG. 5 is a cross-sectional view in the optical axis direction of the picture-taking lens of Example 1.
Figure 6:
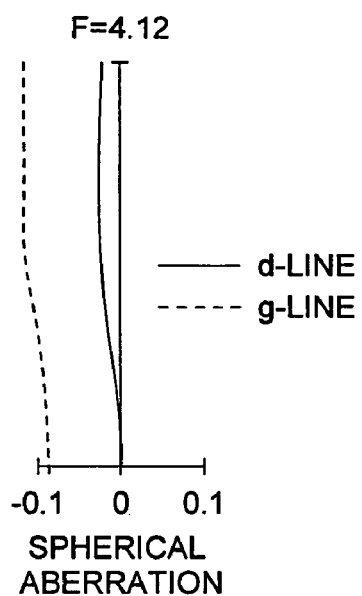
FIG. 6 is an aberration view of Example 1 (spherical aberration (a), astigmatism (b), distortion aberration (c), meridional coma (d)).
Figure 6:
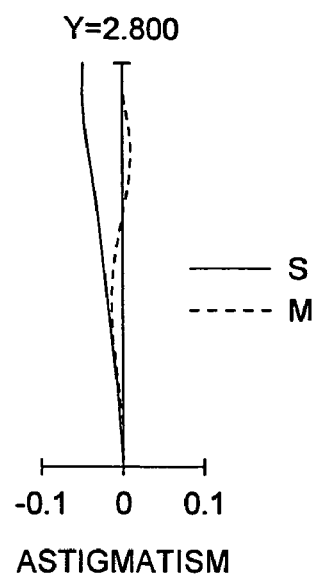
Figure 6:
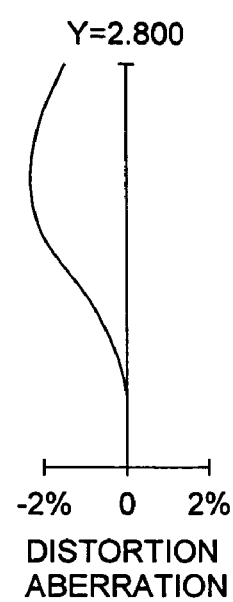
Figure 6:
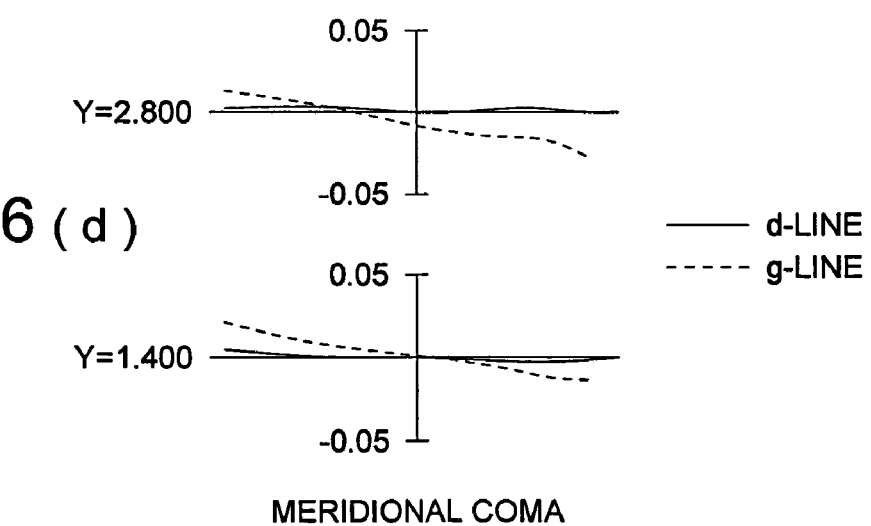

FIG. 5 is a sectional view of the picture-taking lens of Example 1. In the view, L1 is the first lens, L2 is the second lens, L3 is the third lens, and S shows the aperture stop. F is a parallel plate assuming an optical low pass filter, an IR cut filter, and 51a is a photo-electric conversion section of the picture-taking element 51. FIG. 6 is the aberration views (spherical aberration (a), astigmatism (b), distortion aberration (c), meridional coma (d)) relating to the picture-taking lens of Example 1.

Example 2

Lens data of the picture-taking lens according to Example 2 will be shown in Tables 3, 4.

TABLE 3

Example 2
f = 4.60 mm fB = 0.79 mm F = 4.12 2Y = 5.60 mm

| Surface No. | R (mm) | D (mm) | Nd | νd |
|---|---|---|---|---|
| 1 | 1.242 | 0.88 | 1.53180 | 56.0 |
| 2 | 2.225 | 0.16 | | |
| stop | ∞ | 0.77 | | |
| 3 | −1.048 | 0.97 | 1.53180 | 56.0 |
| 4 | −0.799 | 0.10 | | |
| 5 | −6.598 | 0.92 | 1.58300 | 30.0 |
| 6 | 2.518 | 0.40 | | |
| 7 | ∞ | 0.50 | 1.51633 | 64.1 |
| 8 | ∞ | | | |

TABLE 4

Aspheric surface coefficients

The first surface k = 3.97780E−01
A4 = −1.06060E−02
A6 = −1.91750E−02
A8 = 2.73060E−02
A10 = −2.38160E−02
A12 = −2.38550E−03
The 2nd surface K = 8.12693E+00
A4 = −3.51690E−02
A6 = 2.43960E−01
A8 = −9.71100E−01
A10 = 1.53420E+00
The 3rd surface K = 1.20110E−01
A4 = −8.23230E−02
A6 = 6.59290E−02
A8 = 1.99050E−01
A10 = −5.23370E−01
The 4th surface K = −2.84738E+00
A4 = −2.27690E−01
A6 = 1.87320E−01
A8 = −9.92260E−02
A10 = 2.78050E−02
A12 = −5.29960E−03
The 5th surface

K = −5.00000E+01
A4 = 4.76580E−02

TABLE 4-continued

Aspheric surface coefficients

A6 = −1.51150E−02
A8 = 2.91800E−03
A10 = −3.24910E−04
A12 = 1.27100E−05
The 6th surface K = −4.16841E+01
A4 = −4.98150E−02
A6 = 1.34580E−02
A8 = −1.99040E−03
A10 = 1.57950E−04
A12 = −7.80310E−06

Figure 7:
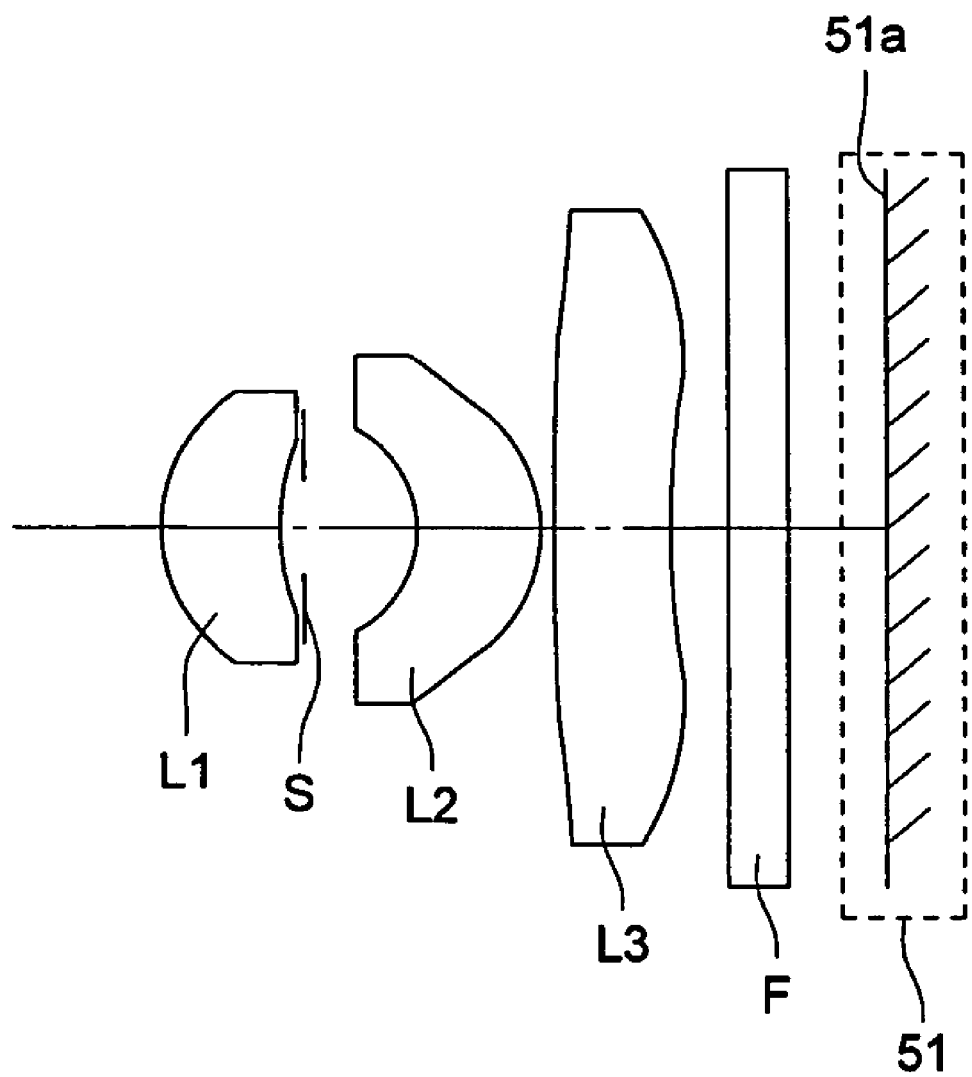
FIG. 7 is a cross-sectional surface view in the optical axis direction of the picture-taking lens of Example 2.
Figure 8:
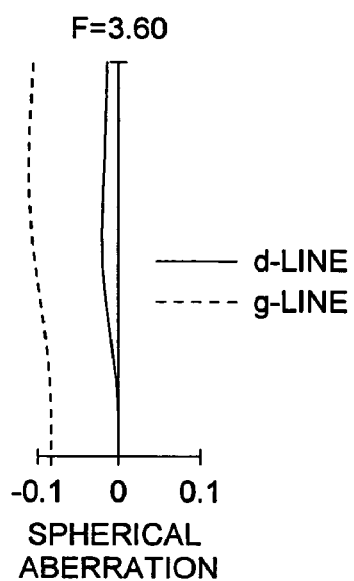
FIG. 8 is an aberration view of Example 2 (spherical aberration (a), astigmatism (b), distortion aberration (c), meridional coma (d)).
Figure 8:
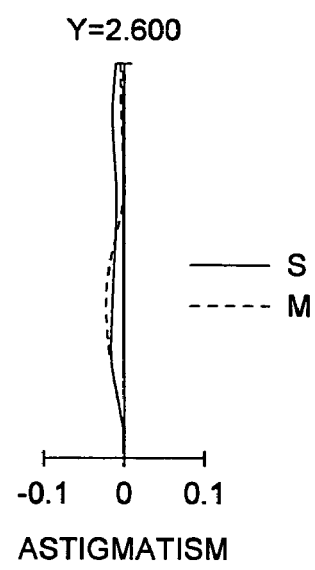
Figure 8:
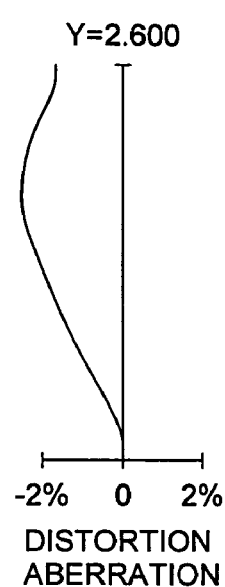
Figure 8:
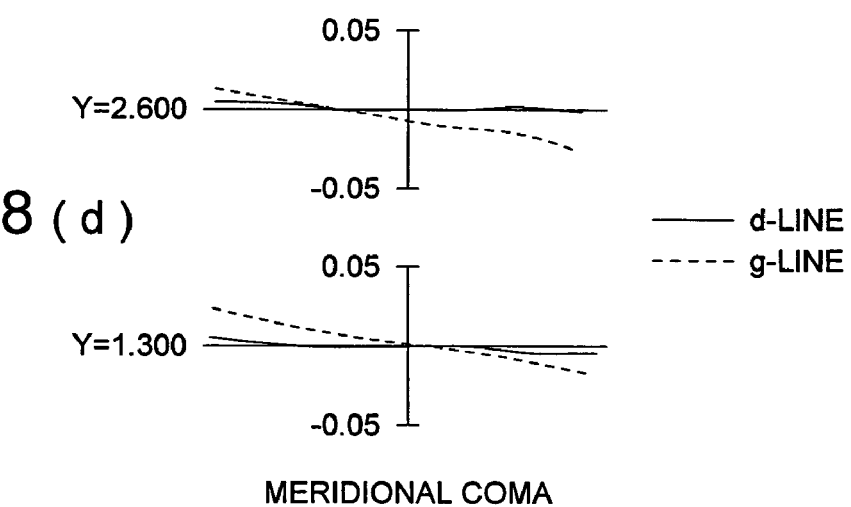

FIG. 7 is a sectional view of the picture-taking lens of Example 2. In the view, L1 is the first lens, L2 is the second lens, L3 is the third lens, and S shows the aperture stop. Further, F is a parallel plate assuming an optical low pass filter, an IR cut filter, and 52a is a photo-electric conversion section of the picture-taking element 51. FIG. 8 is the aberration views (spherical aberration (a), astigmatism (b), distortion aberration (c), meridional coma (d)) of Example 2.

Example 3

Lens data of the picture-taking lens according to Example 3 will be shown in Tables 5, 6.

TABLE 5

Example 3
f = 4.20 mm fB = 0.54 mm F = 3.6 2Y = 5.2 mm

| Surface No. | R (mm) | D (mm) | Nd | νd |
|---|---|---|---|---|
| 1 | 1.381 | 0.81 | 1.53180 | 56.0 |
| 2 | 3.554 | 0.12 | | |
| stop | ∞ | 0.81 | | |
| 3 | −1.170 | 0.78 | 1.53180 | 56.0 |
| 4 | −1.001 | 0.10 | | |
| 5 | 20.774 | 0.83 | 1.58300 | 30.0 |
| 6 | 2.514 | 0.20 | | |
| 7 | ∞ | 0.50 | 1.51633 | 64.1 |
| 8 | ∞ | 0.10 | | |
| 9 | ∞ | 0.41 | 1.51633 | 64.1 |
| 10 | ∞ | | | |

TABLE 6

Aspheric surface coefficients

The first surface k = −6.73670E−01
A4 = 3.27320E−02
A6 = 2.53280E−02
A8 = 3.84740E−02
A10 = −5.89570E−02
A12 = 4.33740E−02
The 2nd surface K = −1.82110E+00
A4 = 6.60610E−03
A6 = 1.68580E−01
A8 = −2.48690E−01
A10 = 2.08900E−01
The 3rd surface

K = −6.53330E−01
A4 = −6.11830E−02

TABLE 6-continued

Aspheric surface coefficients

A6 = −2.80520E−01
A8 = 5.15010E−01
A10 = −4.73750E−01
The 4th surface

K = −2.03220E+00
A4 = −2.73140E−02
A6 = 1.31160E−02
A8 = −6.43620E−02
A10 = 7.95200E−02
A12 = −2.38340E−02
The 5th surface K = −3.12210E+00
A4 = −1.33970E−02
A6 = 2.39370E−03
A8 = −1.00230E−03
A10 = 4.00790E−04
A12 = −4.58380E−05
The 6th surface K = −1.83230E+01
A4 = −7.13560E−02
A6 = 2.32120E−02
A8 = −6.51920E−03
A10 = 8.64380E−04
A12 = −3.83820E−05

Figure 9:
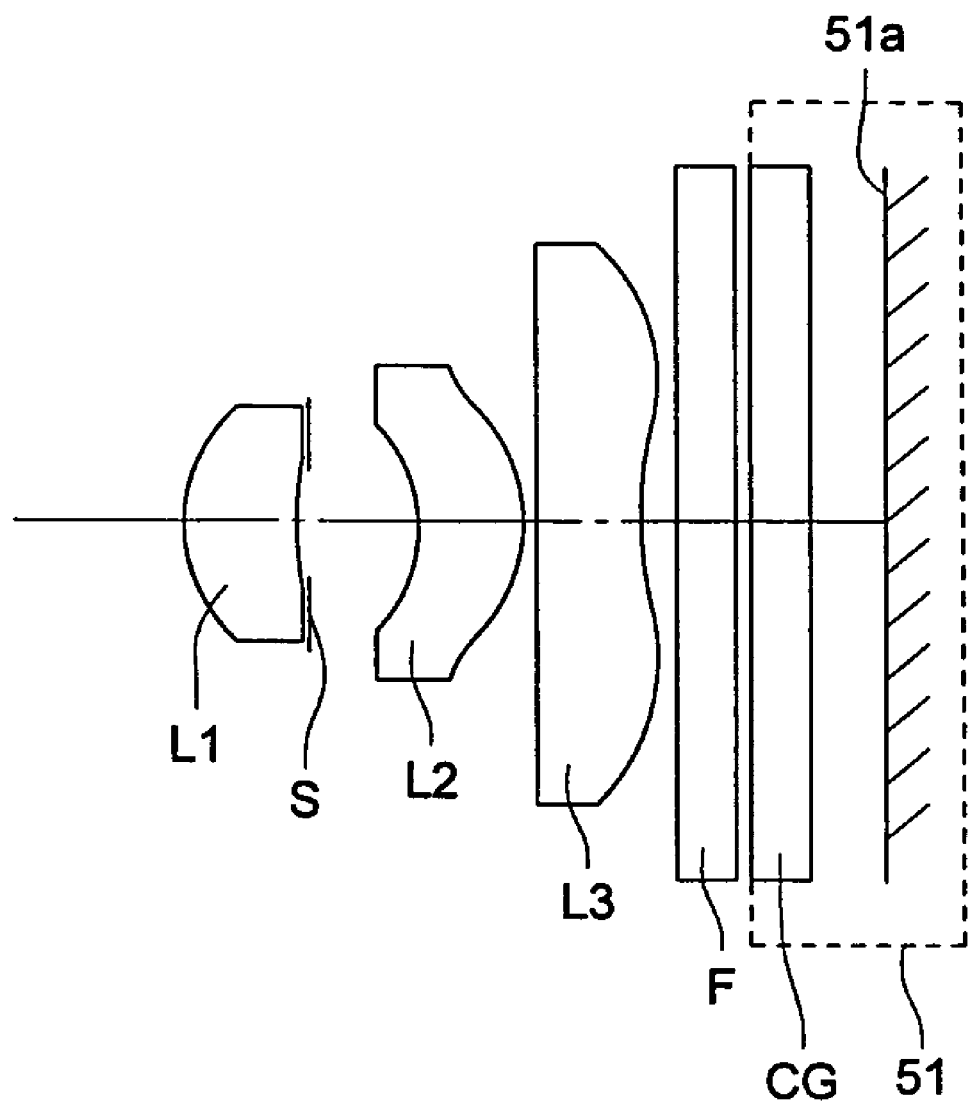
FIG. 9 is a cross-sectional view in the optical axis direction of the picture-taking lens of Example 3.
Figure 10:
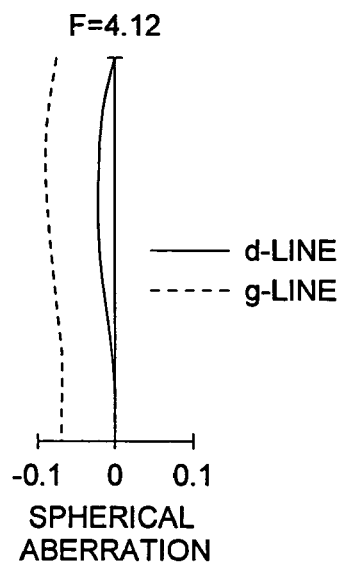
FIG. 10 is an aberration view of Example 3 (spherical aberration (a), astigmatism (b), distortion aberration (c), meridional coma (d)).
Figure 10:
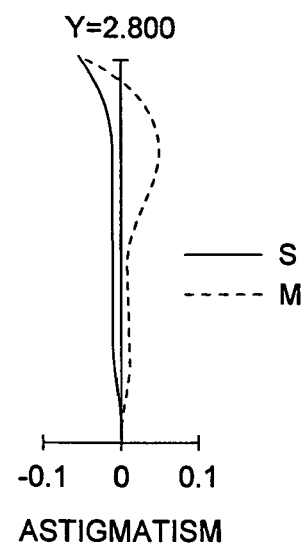
Figure 10:
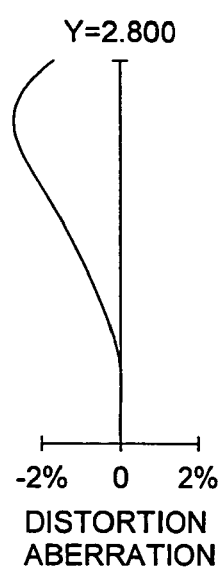
Figure 10:
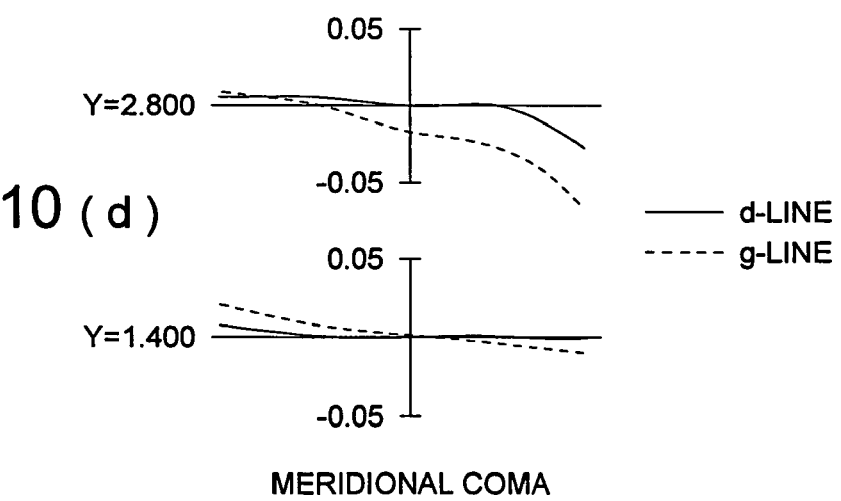

FIG. 9 is a sectional view of the picture-taking lens of Example 3. In the view, L1 is the first lens, L2 is the second lens, L3 is the third lens, and S shows the aperture stop. Further, F is a parallel plate such as an optical low pass filter, an IR cut filter, and CG is a parallel plate assuming a seal glass of the picture-taking element 51 and 51a is a photo-electric conversion section of the picture-taking element 51. FIG. 10 is the aberration views (spherical aberration (a), astigmatism (b), distortion aberration (c), meridional coma (d)) of Example 3. Values of Examples corresponding to each conditional expression will be shown in Table 11.

Example 4

Lens data of the picture-taking lens according to Example 4 will be shown in Tables 7, 8.

TABLE 7

Example 4
f = 4.60 mm fB = 0.46 mm F = 4.12 2Y = 5.6 mm

| Surface No. | R (mm) | D (mm) | Nd | νd |
|---|---|---|---|---|
| 1 | 1.166 | 0.57 | 1.53180 | 56.0 |
| 2 | 3.415 | 0.34 | | |
| stop | ∞ | 0.67 | | |
| 3 | −0.975 | 1.19 | 1.53180 | 56.0 |
| 4 | −1.183 | 0.10 | | |
| 5 | −14.827 | 1.42 | 1.58300 | 30.0 |
| 6 | 4.917 | 0.20 | | |
| 7 | ∞ | 0.50 | 1.51633 | 64.1 |
| 8 | ∞ | | | |

TABLE 8

Aspheric surface coefficients

The first surface k = −6.86320E−01
A4 = 4.61980E−02
A6 = 2.217300E−02
A8 = 5.80070E−02
A10 = −6.35810E−02
A12 = 2.00880E−02
The 2nd surface K = 2.31850E−01
A4 = −8.00390E−03
A6 = 1.64380E−02
A8 = −6.19750E−02
A10 = 3.68360E−02
The 3rd surface K = 9.15350E−01
A4 = −9.54580E−02
A6 = 3.00300E−01
A8 = −6.63020E−01
A10 = 6.14220E−01
The 4th surface K = −3.02830E+00
A4 = −1.23990E−01
A6 = 5.85530E−02
A8 = −3.40440E−02
A10 = 1.13510E−02
A12 = −2.18940E−03
The 5th surface K = −4.99260E+01
A4 = 1.62880E−02
A6 = −4.25280E−04
A8 = −8.39240E−04
A10 = 1.86800E−04
A12 = −1.28720E−05
The 6th surface K = −6.50530E+00
A4 = −5.99010E−02
A6 = 1.90010E−02
A8 = −3.75140E−03
A10 = 3.80670E−04
A12 = −1.53810E−05

Figure 11:
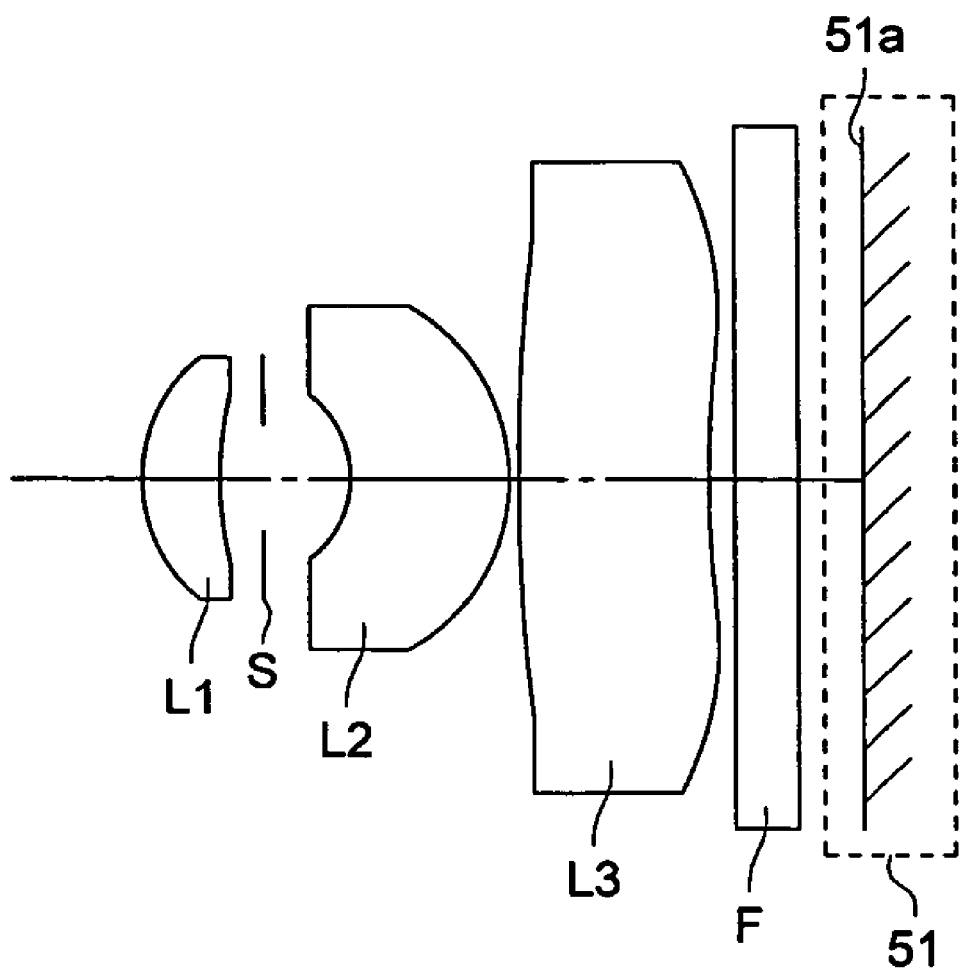
FIG. 11 is a cross-sectional view in the optical axis direction of the picture-taking lens of Example 4.

FIG. 11 is a sectional view of the picture-taking lens of Example 4. In the view, L1 is the first lens, L2 is the second lens, L3 is the third lens, and S shows the aperture stop. Further, F is a parallel plate such as an optical low pass filter, an IR cut filter, and CG is a parallel plate assuming a seal glass of the picture-taking element 51 and 51a is a photo-electric conversion section of the picture-taking element 51. FIG. 12 is the aberration views (spherical aberration (a), astigmatism (b), distortion aberration (c), meridional coma (d)) of Example 4. Values of Examples corresponding to each conditional expression will be shown in Table 11.

Example 5

Lens data of the picture-taking lens according to Example 5 will be shown in Tables 9, 10.

TABLE 9

Example 5
f = 5.29 mm fB = 0.83 mm F = 3.60 2Y = 6.4 mm

| Surface No. | R (mm) | D (mm) | Nd | νd |
|---|---|---|---|---|
| 1 | 2.178 | 1.10 | 1.53180 | 56.0 |
| 2 | 8.715 | 0.24 | | |
| stop | ∞ | 1.00 | | |
| 3 | −1.621 | 1.15 | 1.53180 | 56.0 |
| 4 | −1.072 | 0.10 | | |
| 5 | −20.849 | 1.37 | 1.58300 | 30.0 |
| 6 | 2.116 | 0.50 | | |
| 7 | ∞ | 0.50 | 1.51633 | 64.1 |
| 8 | ∞ | | | |

TABLE 10

Aspheric surface coefficients

The first surface k = −4.55560E−01
A4 = 2.79410E−03
A6 = 6.34670E−03
A8 = −3.90780E−03
A10 = 1.51450E−03
A12 = −2.38460E−04

The 2nd surface

K = −1.21540E+01
A4 = 4.39030E−03
A6 = −6.02930E−03
A8 = 3.81190E−03

The 3rd surface

K = 7.94100E−01
A4 = 2.10320E−02
A6 = −6.74420E−02
A8 = 5.54450E−02
A10 = −5.76860E−02
A12 = 4.07730E−02

The 4th surface

K = −3.02830E+00
A4 = −1.21850E−01
A6 = 6.11580E−02
A8 = −2.75980E−02
A10 = 2.76010E−03
A12 = 1.04130E−03

The 5th surface

K = 1.15440E+01
A4 = −4.94540E−03
A6 = −1.17050E−03
A8 = 1.00290E−03
A10 = −2.65340E−04
A12 = 2.05800E−05

The 6th surface

K = −1.23400E+01
A4 = −2.85110E−02
A6 = 4.83430E−03
A8 = −6.48320E−04
A10 = 4.30900E−05

Figure 13:
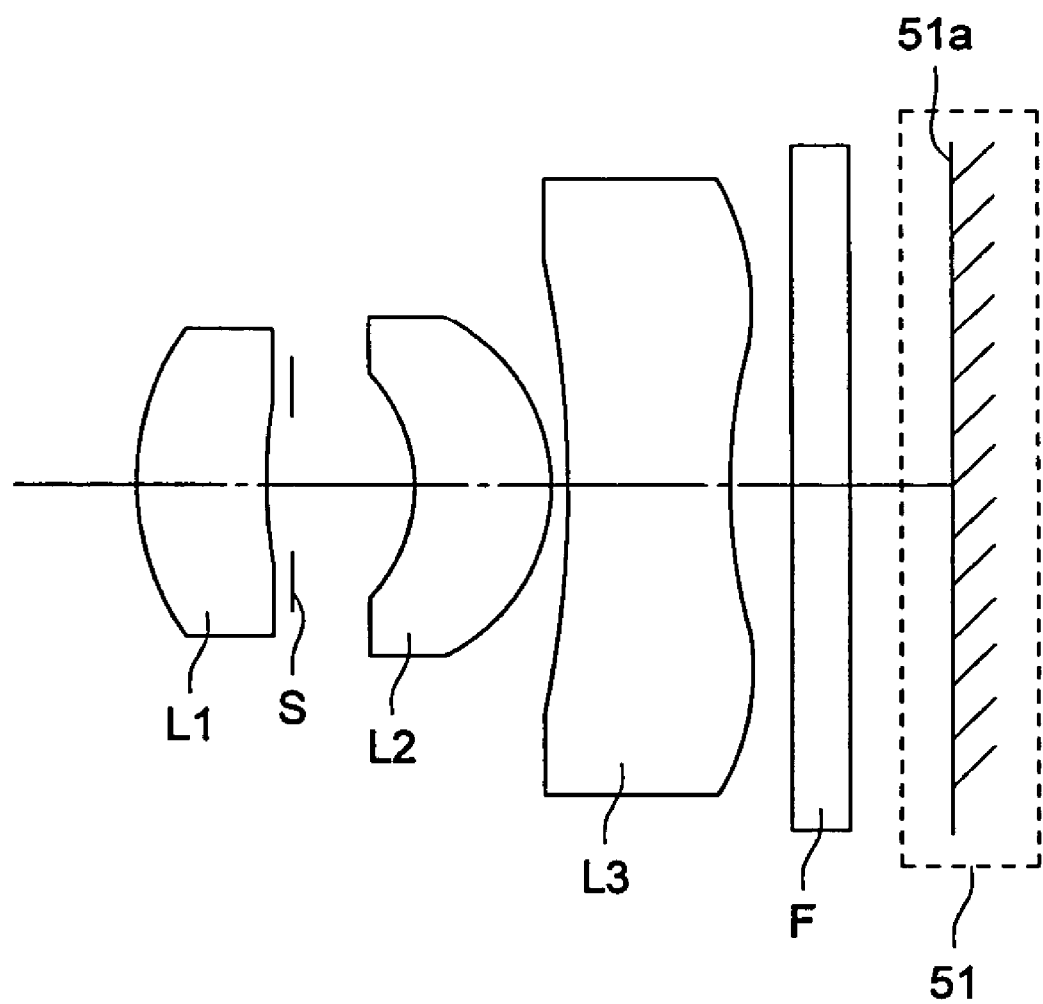
FIG. 13 is a cross-sectional view in the optical axis direction of the picture-taking lens of Example 5.
Figure 14:
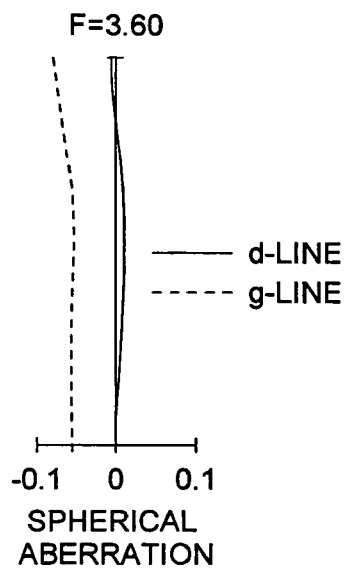
FIG. 14 is an aberration view of Example 5 (spherical aberration (a), astigmatism (b), distortion aberration (c), meridional coma (d)).
Figure 14:
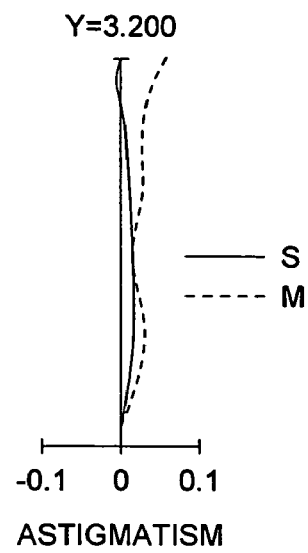
Figure 14:
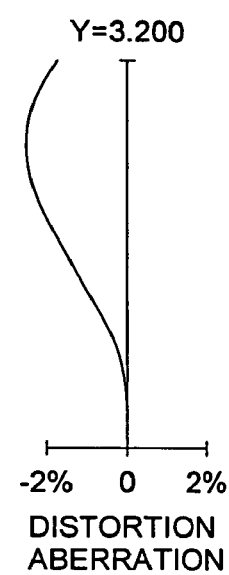
Figure 14:
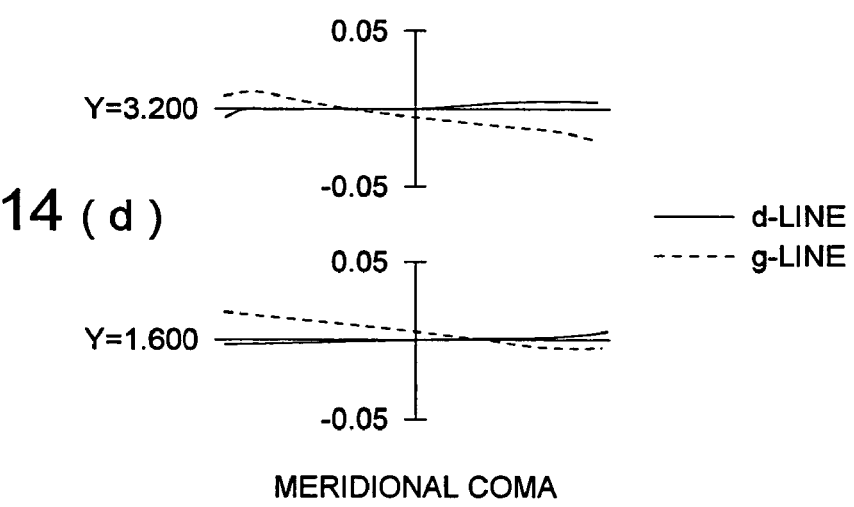

FIG. 13 is a sectional view of the picture-taking lens of Example 5. In the view, L1 is the first lens, L2 is the second lens, L3 is the third lens, and S shows the aperture stop. Further, F is a parallel plate such as an optical low pass filter, an IR cut filter, and CG is a parallel plate assuming a seal glass of the picture-taking element 51 and 51a is a photo-electric conversion section of the picture-taking element 51. FIG. 14 is the aberration views (spherical aberration (a), astigmatism (b), distortion aberration (c), meridional coma (d)) of Example 5. Values of Examples corresponding to each conditional expression will be shown in Table 11.

TABLE 11

| | Example 1 | Example 2 | Example 3 | Example 4 | Example 5 |
|---|---|---|---|---|---|
| (1) R1/f | 0.28 | 0.27 | 0.33 | 0.25 | 0.41 |
| (2) D2/f | 0.19 | 0.20 | 0.22 | 0.22 | 0.23 |
| (3) $P_{air}/P_0$ | −3.50 | −3.95 | −2.80 | −3.62 | −2.19 |
| (5) f3/f | −1.04 | −0.66 | −1.19 | −1.34 | −0.61 |
| (6) {(ν1 + ν2)/2} − ν3 | 26.0 | 26.0 | 26.0 | 26.0 | 26.0 |
| (7) L/f | 1.16 | 1.16 | 1.17 | 1.15 | 1.25 |

In the above-described Examples 1, 2, 3, 4, 5 the first lens L1 and the second lens L2 are formed of poly-olefine plastic material, and a saturation water absorption is not larger than 0.01%. The third lens L3 is formed of poly-carbonate plastic material and saturation water absorption is not larger than 0.4%. Because the plastic lens is larger than the glass lens in the saturation water absorption, there is a tendency that, when there is a sudden humidity change, the unequal distribution of water absorption amount is transiently generated, and the refractive index is not uniform, and the good image formation performance can not be obtained. In order to suppress the deterioration of the performance due to the humidity change, it is preferable that all of the plastic material whose saturation water absorption are not larger than 0.7%, are used.

Further, because the plastic material has a large refractive index change at the time of the temperature change, in the case where all of the first lens L1, the second lens L2 and the third lens L3 are composed of plastic lenses, when the peripheral temperature changes largely, there is a possibility that the image point position of the whole picture-taking lens system is varied. In the image pick-up unit of the specification in which this image point position variation can not be disregarded, for example, the positive first lens L1 is made a lens formed of glass material (for example, glass-mold lens), the positive second lens L2 and the negative third lens L3 are made plastic lenses, and when the refractive index distribution in which the image point position variation at the time of the temperature change is canceled in some degree is made in the second lens L2 and the third lens L3, the problem of this temperature characteristic can be lightened. When the glass-mold lens is used, in order to prevent as possible the consumption of the molding die, it is preferable that the glass material whose glass transition point (Tg) is not larger than 400° C., is used.

Further, recently, it is found that, when inorganic fine particles are mixed in the plastic material, the temperature change of the refractive index of the plastic material can be suppressed small. When it is detailed, generally, when fine particles are mixed in the transparent plastic material, because the scattering of light is generated and the transmission is lowered, it is difficult that it is used as the optical material, however, when the size of the fine particle is made smaller than the wavelength of the transmission light flux, the scattering is made possible in such a manner that it is not practically generated. In the plastic material, the refractive index is lowered when the temperature rises, however, in the inorganic particle, the refractive index is increased when the temperature rises. Accordingly, when by using these temperature dependency, they are made to act so that they are cancelled out each other, it is possible that the refractive index change is scarcely generated.

Specifically, when inorganic particles whose maximum length is not larger than 20 nm are dispersed in the plastic material as the base material, the plastic material in which the temperature dependency of the refractive index is vary low, can be obtained. For example, when fine particles of niobium oxide ($Nb_2O_5$) are dispersed in acrylic resin, the refractive index change due to the temperature change can be reduced. In the present example, when the plastic material in which such inorganic particles are dispersed, is used for one lens of 2 positive lenses (L1, L2) or all lenses (L1, L2, L3), the image point position variation at the time of temperature change of the whole picture-taking lens system can be suppressed small.

Hereupon, in the present Example, the principal ray incident angle of the light flux incident on the imaging surface of the solid picture-taking element, is not necessarily designed in such a manner that it is sufficiently small in the peripheral part of the imaging surface. However, in the recent technology, by the revision of the color filter of the solid picture-taking element or the arrangement of on-chip micro lens array, it becomes possible that shading can be lightened. Specifically, when the pitch of the arrangement of the color filter or the on-chip micro lens array is set slightly small to the pixel pitch of the imaging surface of the picture-taking element, because, as it goes to the peripheral part of the imaging surface, to each pixel, the color filter or the on-chip micro lens array is shifted to the optical axis side of the picture-taking lens, the slant incident light flux can be effectively guided to the light receiving part of each pixel. Hereby, the shading generated in the solid picture-taking element can be suppress small. For the amount for which the above-described requirement is softened, the present Example is the designed example which aims further size reduction.

What is claimed is:

1. A picture-taking lens for forming an image of an object image on a solid picture-taking element, comprising in order from the object side:
    a first lens having a positive refractive power and directing a convex surface toward the object side;
    an aperture stop,
    a second lens having a positive refractive power and a meniscus shape directing a convex surface toward the image side; and
    a third lens having a negative refractive power and directing a concave surface toward the image side, wherein the picture-taking lens satisfies the following conditional expression:

$$0.20 < R1/f < 0.42 \quad (1)$$

$$0.10 < D2/f < 0.40 \quad (2),$$

where R1 is a radius of curvature of the object side surface of the first lens, D2 is an air gap on the axis between the first lens and the second lens, f is a focal length of a whole system of the picture-taking lens.

2. The picture-taking lens of claim 1, wherein the picture-taking lens satisfies the following conditional expression:

$$-5 < P_{air}/P_0 < -1.3 \quad (3)$$

where $P_0$ is a refractive power of a whole system of the picture-taking lens, and $P_{air}$ is a refractive power of a so-called air lens formed by an image side surface of the first lens and an object side surface of the second lens, here, the refractive power is an inverse number of the focal length, and the Pair is calculated by the following expression (4):

$$P_{air} = (1-N1)/R2 + (N2-1)/R3 - \{(1-N1)\cdot(N2-1)/(R2\cdot R3)\}\cdot D2 \quad (4)$$

where, N1 is a refractive index of the first lens for d-line, N2 is a refractive index of the second lens for d-line, R2 is a radius of curvature of the image side surface of the first lens, R3 is a radius of curvature of the object side surface of the second lens, and D2 is an air gap on the axes between the first lens and the second lens.

3. The picture-taking lens of claim 1, wherein the picture-taking lens satisfies the following conditional expression:

$$-2.0 < f3/f < -0.4 \quad (5)$$

where, f3 is a focal length of the third lens, f is a focal length of a whole system of the picture-taking lens.

4. The picture-taking lens of claim 1, wherein the third lens comprises a double concave shape.

5. The picture-taking lens of claim 1, wherein the picture-taking lens satisfies the following conditional expression:

$$20 < \{(v1+v2)/2\} - v3 < 65 \quad (6)$$

where, v1 is Abbe's number of the first lens, v2 is Abbe's number of the second lens, and v3 is Abbe's number of the third lens.

6. The picture-taking lens of claim 1, wherein the first lens, the second lens and the third lens are made of plastic material.

7. A picture-taking unit, comprising:
    a solid picture-taking element provided with a photoelectric conversion section;
    the picture-taking lens described in claim 1 and for forming an image of an object image on the photoelectric conversion section of the solid picture-taking element;
    a substrate to hold the solid picture-taking element and having an external connection terminal for sending and receiving an electric signal; and
    a casing having an opening section for an incidence light from the object side and made of a light shielding member, wherein the solid picture-taking element, the picture-taking lens, the substrate and the casing are integrally formed in one body, and the height of the image pick-up unit in the optical axis direction of the picture-taking lens is 10 mm or less.

8. A cell phone terminal, comprising:
    the picture-taking unit described in claim 7.

* * * * *